Jan. 1, 1929.

A. C. HAMILTON

MOTOR VEHICLE CONSTRUCTION

Filed Jan. 3, 1927

Inventor
Alexander C. Hamilton

By John Harness
Attorney

Patented Jan. 1, 1929.

1,697,239

UNITED STATES PATENT OFFICE.

ALEXANDER C. HAMILTON, OF DETROIT, MICHIGAN, ASSIGNOR, BY MESNE ASSIGNMENTS, TO RELAY MOTOR PRODUCTS CORPORATION, OF BRIDGEPORT, CONNECTICUT, A CORPORATION OF DELAWARE.

MOTOR-VEHICLE CONSTRUCTION.

Application filed January 3, 1927. Serial No. 158,434.

My invention relates to improvements in driving mechanism for motor vehicles wherein the weight of the vehicle, together with its load, may be utilized to assist the forward and rearward rotation of the driving wheels in addition to the tractive effort imparted to the driving wheels from the power plant of the vehicle, and has for its main object the provision of a chain drive construction which is of simple, economical and efficient design.

My invention more specifically deals with mounting the road traction wheels on a dead axle or spindle, equipping the wheels with internal gear rings meshing with and driven by spur gears on short jack shafts, and the jack shafts driven by sprockets and chains from the main vehicle transmission located in the chassis frame. The jack shafts are housed in casings which are suspended from and keyed to the dead axle. These casings receive the vehicle load through arched spring perches swiveled upon them concentric to the jack shafts, and radius rods made integral with the spring perches connect them with the chassis frame in such a manner that the radius rods serve to propel the vehicle forward as well as to adjust the chain length.

With the above and other objects in view, my invention consists in the arrangement, combination and construction of the various elements of my improved device, as described in the specification, claimed in my claims, and shown in the accompanying drawings, in which:
Fig. 1 is a rear elevation, partly in section, of the axle construction and frame location.

Figure 1:
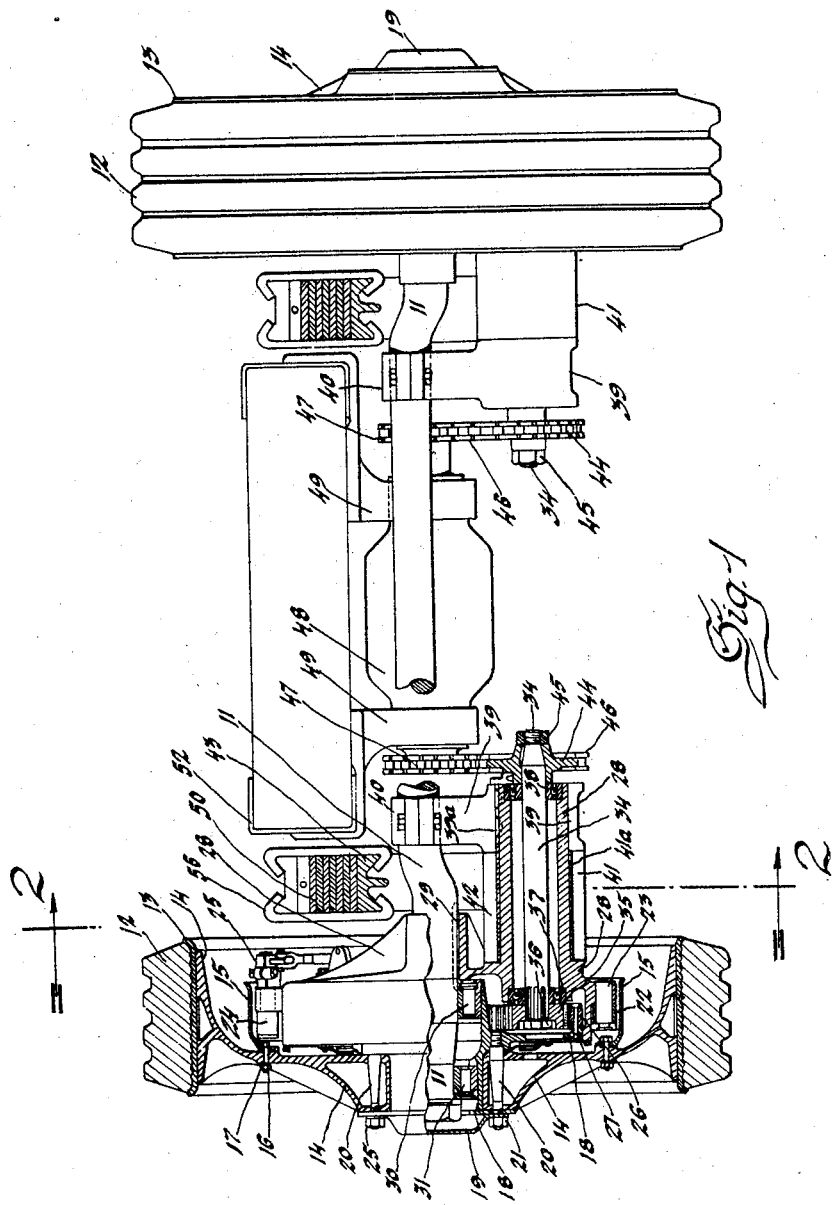

In the drawings, 11 is the dead axle made of one solid piece throughout its length. On the ends of the dead axle 11 are mounted antifriction bearings 30 and 31 and on these bearings the hub 18 rotates. The wheel body 14 is mounted on the hub 18 and is secured thereto by the bolts 20 and the nuts 21. On the wheel body 14 is mounted the rim 13 which in turn carries the tire 12. The brake drum 15 is secured to the wheel body 14 by the bolts 16 and nuts 17. The hub cap 19 is held in place by the bolts 20 and nuts 21. On the flange of the hub 18 is mounted an internal gear ring 26 by means of a series of rivets 27, thus permitting the gear ring 26 to be made of a different material than the wheel body 14, besides making replacement of the gear ring 26 a simple operation.

The casting 28 which encases the jack shaft 34, surrounds the dead axle 11 and is keyed to it as at 29. The axle 11 is "cranked" or bent to avoid interference with the chain (to be described later) and in its offset portion is connected to the casing 28 by means of the bracket 39 and bracket cap 40, the latter being clamped on the dead axle by bolts 75. The bracket 39 also slips over the turned end of the casing 28 and is keyed to it as at $39^a$ to prevent relative rotation. This combination serves to securely lock together the parts 11, 28, 39 and 40 thereby causing them to function as a unit.

A spider on the wheel end of the casing 28 serves to support the brake band 22 by the anchor pin 23 and the brake operating cam 24. Cam 24 and its shaft are integral and to them is attached the brake operating lever 25.

Within the casing 28 is the jack shaft 34 which runs in the antifriction bearings 37 and 38 borne by the casing 28. On the wheel end of the jack shaft 34 is mounted the spur pinion 35 by means of a spline and the nut 36. This pinion 35 meshes with the internal ring gear 26 previously described as being attached to the wheel hub 18. Therefore, when the jack shaft 34 is rotated, the wheel is rotated in proportion to the gear ratio of part 35 to part 26.

On the inner end of the jack shaft 34 is a sprocket 44 held in place by a taper key and the nut 45. The sprocket 44 receives its drive through the chain 46 from the sprocket 47 which in turn is on the countershaft in the transmission 48, which is mounted in the chassis frame 52 by means of the bracket hangers 49—49. The transmission with its usual change gear mechanism receives power from the vehicle engine in the usual conventional manner.

Surrounding the casing 28 at a point laterally between the attachment of the bracket 39 and the pinion 35 is trunnioned the plate 41 and its cap 42 which are bolted together around the bushing 41ª. The plate 41 extends beyond the ends of the cap 42, and on its upper side is bolted the spring perch 43 that arches up over the dead axle 11 and on its upper surface has rigidly bolted to it the leaf spring 50. The leaf springs 50 are rigidly secured to the perches 43 by the clips 56, and at their ends are shackled to the frame 52 by the swinging links 51.

On the under and forward side of the plate 41 is securedly bolted the rear end of the radius rod 53. The forward end of this radius rod 53 is swiveled at 54 on the transmission bracket 49, the center of this swivel being coincident with the center of the countershaft in the transmission 48 which bears the sprocket 47. Thus the radius rod 53 serves to keep the sprockets 44 and 47 in fixed relation to each other and keep the chain 46 taut. An adjustment is provided at 55 for the purpose of compensating for any stretch in the chain 46.

Figure 2:
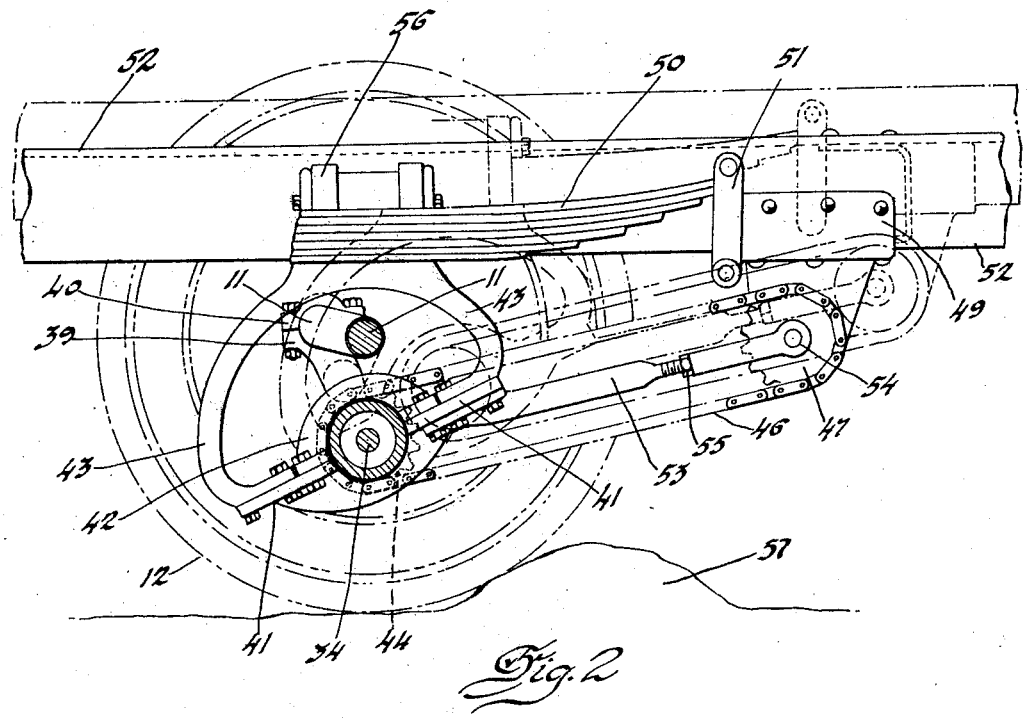
Fig. 2 is a section taken on line 2—2 of Fig. 1, disclosing relative location of the axle elements in their normal position, as well as their relative location when an obstacle has been encountered and the wheel momentarily stopped, the latter being shown in dotted lines.
Figure 3:
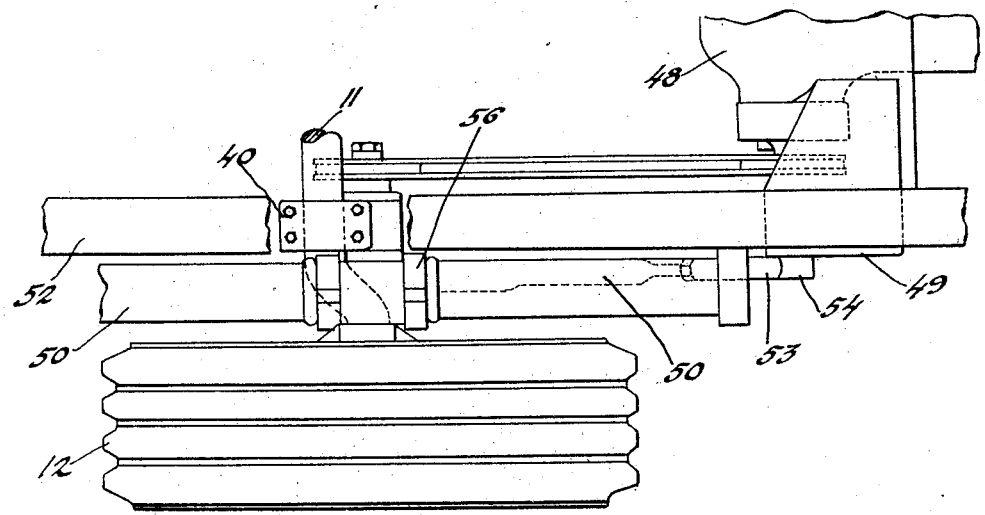
Fig. 3 is a plan view from above one wheel and spring, with the frame broken away to disclose relative positions of the dead axle to the chain and sprockets.

It follows that when the vehicle is proceeding along the road and a driving wheel meets an obstruction as at 57 (Fig. 2) the wheel momentarily stops and the following action takes place. The shaft 34 continues to rotate by virtue of the power received by it from the sprocket 44 which in turn receives its power from the transmission through the sprocket 47 and the chain 46. As the shaft 34 rotates on its axis, the pinion 35, being in mesh with the ring gear 26 and meeting with resistance to its rotation, starts to climb up around the inside of the ring gear 26, carrying with it the casing 28. Since the casing 28 is a unit with the bracket 39, cap 40 and axle 11, the axle is caused to rotate within the wheel bearings 30 and 31 and swing back. The radius rod 53, being rigidly secured to the spring perch 43, pushes forward on the brackets 49 while the perch is lifting in response to the climbing action of the pinion gear, the forward component of the climbing motion forcing the radius rod forward. This combined forward and lifting motion raises the frame of the chassis upward through the springs, and forward through the radius rods. The advanced position is indicated by dotted lines in Fig. 2. This climbing effect continues until the weight of the vehicle and load above the springs attain sufficient fulcrum on the pinion 35 within the ring gear 26 to overcome the resistance of the obstruction 57 to the driving wheel, whereupon the wheel itself climbs over the obstruction and the pinion 35 and casing 28 swing downward and resume their original and normal position as shown in full lines in Fig. 2. Thus it will be seen that the weight of the vehicle and its load have served to assist and augment the rotation of driving wheels occasioned by the motive power of the vehicle.

When the vehicle is running in the reverse direction, the pinion climbs backward and upward, lifting the chassis upward through the springs and pulling it backward through the radius rods, thus assisting rearward motion with equal facility. It will be noted that the axle 11 is cranked slightly up and back, so that when in the extreme rear position, the axle will not interfere with the sprocket 44 and chain 46 as it would if the "cranking" or offset were not present. It will also be noted that the form of the spring perch 43 is such that it clears the axle 11 through a wide angular swinging of the casing 28 and associated parts, but that in extreme positions the axle will finally strike the spring perch and limit further rotation.

It will further be noted that since the brake shoes 22 are anchored by the pin 23 to the casing 28, and the brake drums 15 are attached to the wheel body 14, the application of the brakes will cause the casing 28 to travel around the wheel center just as though the pinion 35 were climbing within the gear 26, only in the reverse direction, thus lifting the vehicle chassis and its load in the proper direction to assist the braking action in stopping the vehicle. It will likewise be noted that this braking effect operates with equal facility whether the vehicle is proceeding forward or backward.

It will be apparent now that I have devised a novel and useful construction in a very simple combination. Obviously, changes in detail may be made by one skilled in the art, without departing from the theory of my invention, and I do not care to limit myself to any particular form or arrangement of these elements.

What I claim is:

1. In combination with a motor vehicle, a wheel axle, a wheel rotatably secured to each end of said axle, a housing non-rotatably secured adjacent one end of said axle, a second housing non-rotatably secured adjacent the opposite end of said axle, an axle shaft rotatably supported in each of said housings eccentric to said wheel axle and projecting beyond the ends of said housings, a sprocket secured to the inner end of each of said axle shafts, a pinion secured to the outer end of each of said axle shafts for driving the corresponding of said wheels, driving means including a pair of sprockets secured to the frame of said vehicle, and a chain connecting each of the first mentioned sprockets with the corresponding of the last mentioned sprockets.

2. In combination with a motor vehicle, a wheel axle, a wheel rotatably secured to each end of said axle, a housing non-rotatably secured adjacent one end of said axle, a second housing non-rotatably secured adjacent the opposite end of said axle, an axle shaft rotatably supported in each of said housings eccentric to said wheel axle and projecting beyond the ends of said housings, a sprocket secured to the inner end of each of said axle shafts, a pinion secured to the outer end of each of said axle shafts for driving the corresponding of said wheels, driving means including a pair of sprockets secured to the frame of said vehicle, a chain connecting each of the first mentioned sprockets with the corresponding of the last mentioned sprockets, and means for adjustably maintaining a predetermined distance between the centers of each co-operating pair of said sprockets.

3. In combination, a pair of spaced housings provided with aligned openings, a wheel axle rigidly secured to and joining said housings, said wheel axle being offset from said openings, a wheel rotatably mounted on each end of said wheel axle, a gear secured to each of said wheels in concentric relationship in respect thereto, a shaft rotatably received in each of said openings, a pinion on each of said shafts in mesh with the corresponding said gear, a sprocket on the inner end of each of said shafts, a vehicle frame, a load carrying spring rotatably mounted on each of said housings and secured to said frame, a pair of rotatable driving shafts fixed to said frame, a sprocket on each of said driving shafts in line with the first mentioned sprockets, and a chain connecting each of said sprockets on said driving shafts with the corresponding of said sprockets on said axle shafts.

4. In combination, a pair of spaced housings provided with aligned openings, a wheel axle rigidly secured to and joining said housings, said wheel axle being offset from said openings, a wheel rotatably mounted on each end of said wheel axle, a gear secured to each of said wheels in concentric relationship in respect thereto, a shaft rotatably received in each of said openings, a pinion on each of said shafts in mesh with the corresponding said gear, a sprocket on the inner end of each of said shafts, a vehicle frame, a spring perch rotatably mounted on each of said housings, a load carrying spring fixed to each of said perches and connected to said frame, a pair of rotatable driving shafts fixed to said frame, a sprocket secured to each of said driving shafts, a chain connecting each of the last mentioned sprockets with the corresponding of the first mentioned sprockets, and a pair of rigid members adjustable in length pivotally connected at one end to said frame to swing about the axes of said driving shafts and fixed at their opposite ends to said perches.

ALEXANDER C. HAMILTON.